United States Patent
Sadowara

(10) Patent No.: US 7,307,759 B2
(45) Date of Patent: Dec. 11, 2007

(54) METHOD AND EQUIPMENT FOR AUTOMATICALLY PERFORMING COLOR/MONOCHROME JUDGING OF AN ORIGINAL

(75) Inventor: Tetsuya Sadowara, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 998 days.

(21) Appl. No.: 10/446,785

(22) Filed: May 29, 2003

(65) Prior Publication Data

US 2004/0239995 A1 Dec. 2, 2004

(51) Int. Cl.
- *H04N 1/48* (2006.01)
- *H04N 1/50* (2006.01)
- *H04N 1/56* (2006.01)
- *H04N 1/64* (2006.01)

(52) U.S. Cl. ............... 358/2.1; 358/1.16; 358/505; 358/518; 358/524; 358/539

(58) Field of Classification Search ............... 358/1.6, 358/2.1, 1.16, 505, 518, 524, 462, 474, 539, 358/166; 382/173, 176, 162, 164

See application file for complete search history.

(56) References Cited

U.S. PATENT DOCUMENTS

| | | | | |
|---|---|---|---|---|
| 5,287,204 A | * | 2/1994 | Koizumi et al. | 358/538 |
| 5,420,938 A | * | 5/1995 | Funada et al. | 382/173 |
| 5,583,667 A | * | 12/1996 | Yamada | 358/529 |
| 6,256,112 B1 | * | 7/2001 | Kawano | 358/1.9 |
| 2005/0162672 A1 | * | 7/2005 | Hiramatsu | 358/1.9 |
| 2005/0280865 A1 | * | 12/2005 | Oteki | 358/2.1 |

FOREIGN PATENT DOCUMENTS

JP 2001-292279 A 10/2001

* cited by examiner

*Primary Examiner*—Scott A. Rogers
(74) *Attorney, Agent, or Firm*—Foley & Lardner LLP

(57) ABSTRACT

A copier and method for automatically determining whether the original is color or monochrome and generating a corresponding copy. The copier comprises a scanner which generates RGB data from the document, a color/monochrome processor which determines whether the document is a color or monochrome document based on the RGB data from the scanner.

11 Claims, 4 Drawing Sheets

METHOD AND EQUIPMENT FOR AUTOMATICALLY PERFORMING COLOR/MONOCHROME JUDGING OF AN ORIGINAL

BACKGROUND OF THE INVENTION

1. Field of the Invention

The present invention is directed generally to photocopying and specifically to photocopying methods and equipment which automatically determine whether the original document is color or monochrome.

2. Background of the Invention

Photocopying equipment capable of making both monochrome and color copies is known. However, conventional photocopying equipment is configured to use two scans. The first, a pre-scan, is preformed to determine whether the original document is monochrome or color. In the pre-scan, not all of the data is read. It is a rough scan which can be done at a faster scanning speed than scanning for copying.

The original is scanned again after determining whether the original is monochrome or color. If the original was determined to be color in the pre-scan, the image is scanned with an RGB signal. If the original was determined to be monochrome, the image is scanned with a black signal. In this manner, the original can be processed (and the copies made) using an optimal processing method for copying.

Although this method works, the required two scans take an appreciable amount of time to complete. To improve the speed of copying, it would be advantageous to have photocopying equipment capable of copying both color and monochrome with only a single scan.

SUMMARY OF THE INVENTION

In accordance with one aspect of the present invention, there has been provided a color/monochrome copier capable of distinguishing and copying color and monochrome originals with a single scan comprising a scanner which generates RGB data from the original, and a color/monochrome processor which determines whether the original is color or monochrome based on the RGB data from the scanner, wherein the scanner generates sufficient RGB data in a single scan for the color/monochrome processor to determine if the original is color or monochrome and to produce either a color or monochrome copy therefrom.

In accordance with another aspect of the invention, there is provided a method of copying comprising scanning an original in a single scan to generate sufficient RGB data for a color/monochrome processor to determine if the original is color or monochrome and to produce either a color or monochrome copy, determining whether the original is color or monochrome based on the RGB data and printing a copy of the original without additional scanning of the original.

In accordance with another aspect of the invention, there is provided a computer readable medium comprising machine readable code for causing copier to perform the following method steps: scanning an original to generate RGB data, determining whether the original document is color or monochrome based on the RGB data, converting the RGB data to CMY data with a first data converter, compressing the CMY data, storing the compressed CMY data, decompressing the compressed CMY data in accordance with the determination of whether the original is color or monochrome, converting the decompressed CMY data in accordance with the determination of whether the original is color or monochrome and printing the document based on the converted CMY data (color or monochrome).

Further features, aspects and advantages of the present invention will become apparent from the detailed description of preferred embodiments that follows, when considered together with the accompanying figures of drawing.

DETAILED DESCRIPTION OF PREFERRED EMBODIMENTS

The present inventor has discovered that it is possible to improve the speed of copying of a color/monochrome copier by eliminating the pre-scan. By collecting sufficient data initially, it is possible to determine whether the original is color or monochrome and to have all the information necessary to make either color or monochrome copies. Thus, the decision whether to process the data as color or monochrome can be made just prior to or substantially simultaneously with the relatively time consuming image processing step.

Figure 1:
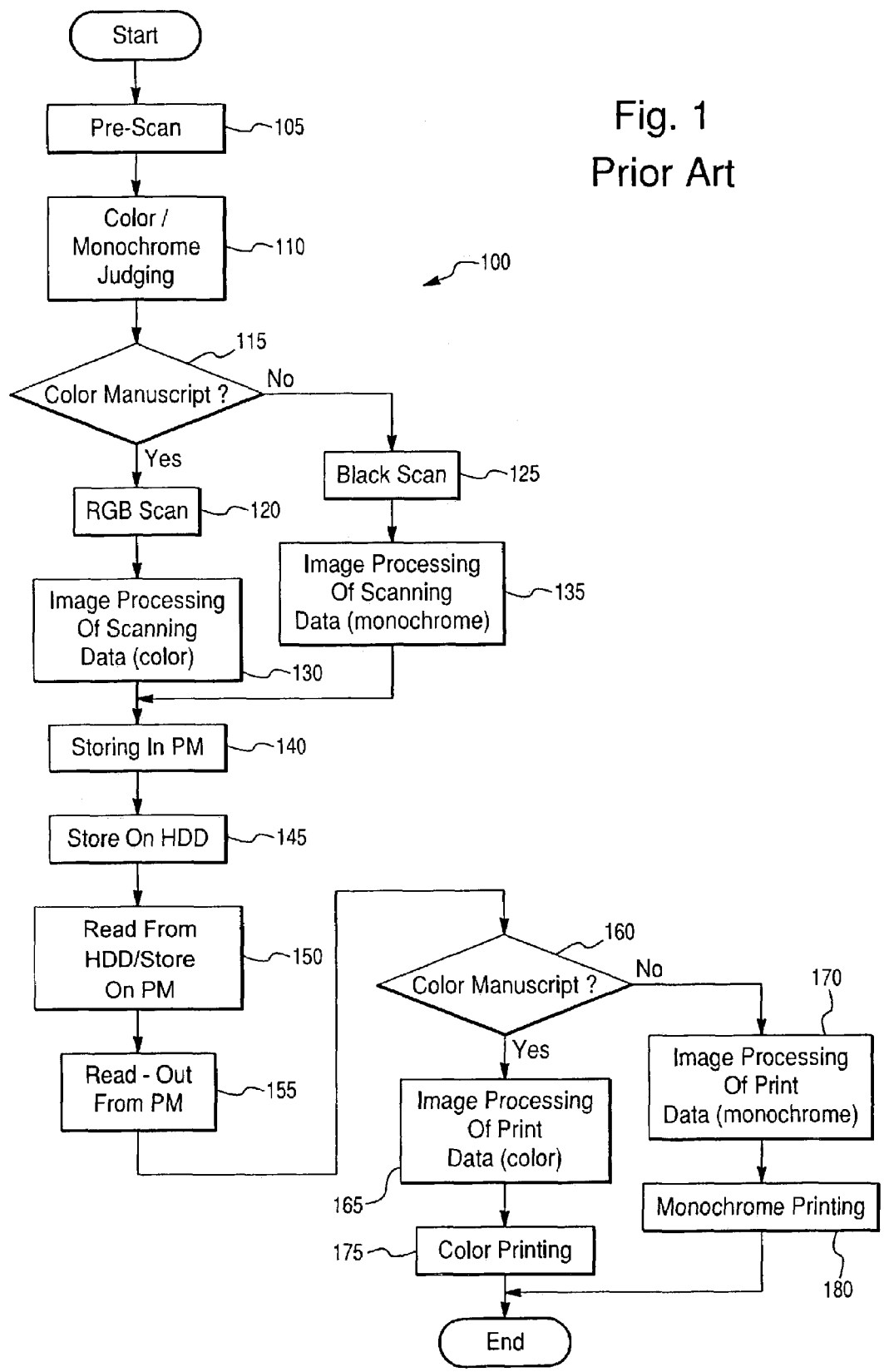
FIG. 1 is a flow chart illustrating the processing steps of a conventional photocopier.
Figure 3:
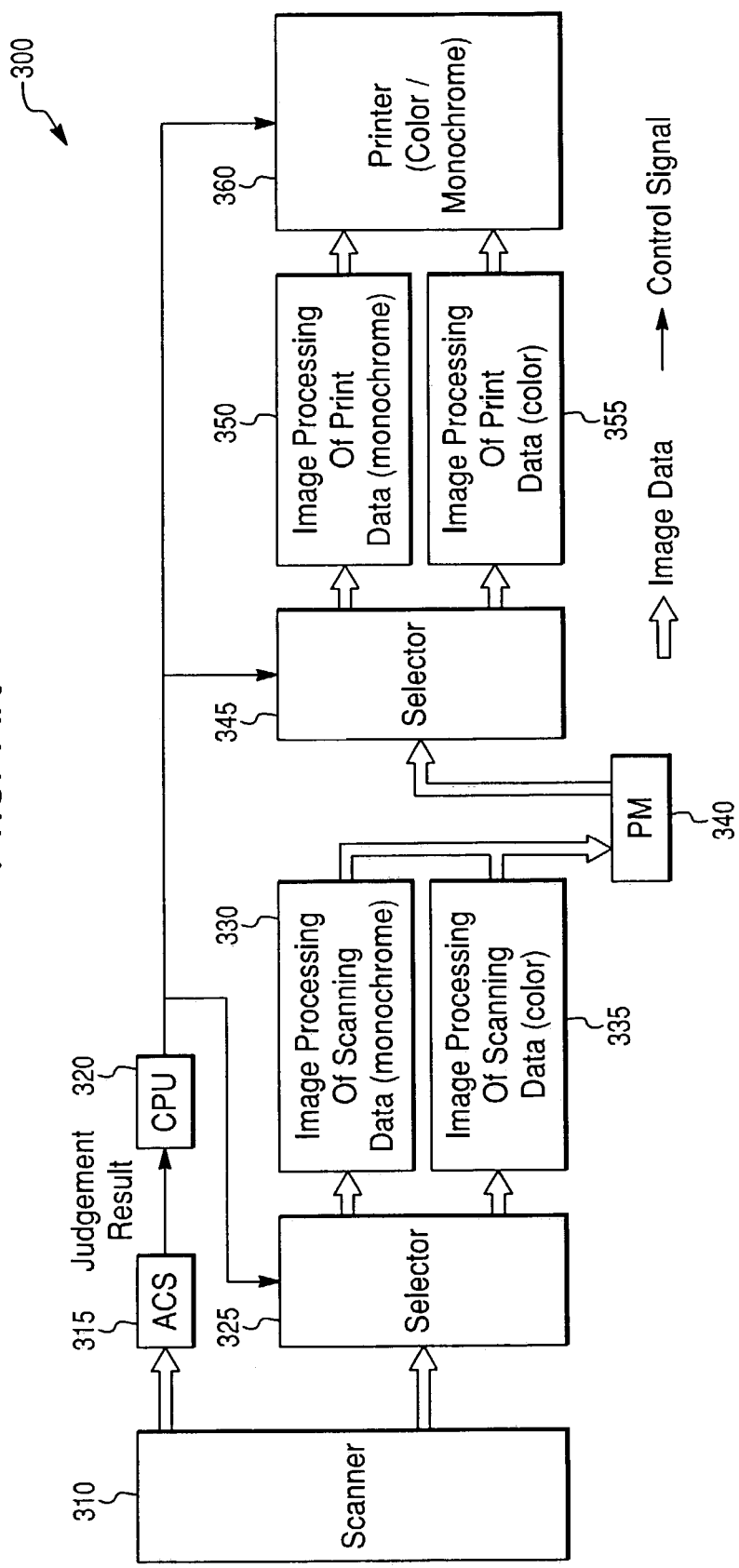
FIG. 3 is a schematic diagram illustrating the components of a conventional photocopier.

The conventional color/monochrome photocopier 300 and its operation 100 are illustrated in FIGS. 1 and 3. The conventional copier 300 includes a scanner 310 and an automatic color-mode selection (ACS) system 315. In the conventional process 100, the first step is a pre-scan 105 performed by the scanner 310. This is a relatively rougher scan than a full scan, where a minimal amount of data is read. From the data collected in the pre-scan, a determination 110 is made in the ACS system 315 whether the original is color or monochrome. The result of the determination 110 is stored in a CPU 320. Based on the determination 110, a decision 115 is then made in a selector 325 to either perform a full RGB scan 120 for a color original or a full black scan 125 for a monochrome original. Scan 120 is done with high resolution for the color or the monochromatic scan. There are differences between the color image processing and the monochrome image processing, and the CPU 320 controls the selector 325 so as to perform the proper processing on the scanned data.

Once the full scans 120, 125 are complete, the scanning data must be image processed 130, 135. There are differences between the color image processing and the monochrome image processing. If the original was color, for example, the RGB data is converted to YMC data in a color scan processor 335. Then the data is compressed. Compression of the YMC data reduces the amount of data.

If the original was monochrome, the image processing may include density adjustment, range compensation, and binarization, such as error diffusion or forming two simple values. Typically, the data is converted from 8-bit to 1-bit in a monochrome scan processor 330. That is, the data is assigned 0 for white or 1 for black. Note, the processing of monochrome data includes a step of determining a threshold for black. This is useful because some originals, e.g. newspaper, have a gray background which has to be distinguished from the text. However, because less data is required for monochrome copying, there is no need to compress the monochrome data. If the original is monochrome and processed as 8-bit data instead of 1-bit data, it is also possible to compress the monochrome data.

Once the scanning data is image processed 130, 135, it is stored 140 in page memory 340. Typically, just the current page is stored in page memory 340. Before the next page is stored in page memory 340, the current page is stored 145 on a hard disk drive. To print, the first page is read from the hard disk drive and stored in a second page memory buffer 150. It is then read out 155 from second page memory buffer for printing. Based on the determination 110, a decision 160 is made in a selector 345 to either perform color processing of print data 165 in a color print processor 355 or monochrome processing of print data 170 in a monochrome print processor 350 for a monochrome original. Color image processing may include extension of the compression image data, conversion of the YMC data to YMCK data and gradation processing. Monochrome processing may include, for example, shaving processing to save toner. Once the data is processed 165, 170, the printer 360 prints a color copy 175 or a monochrome copy 180 as needed.

Figure 2:
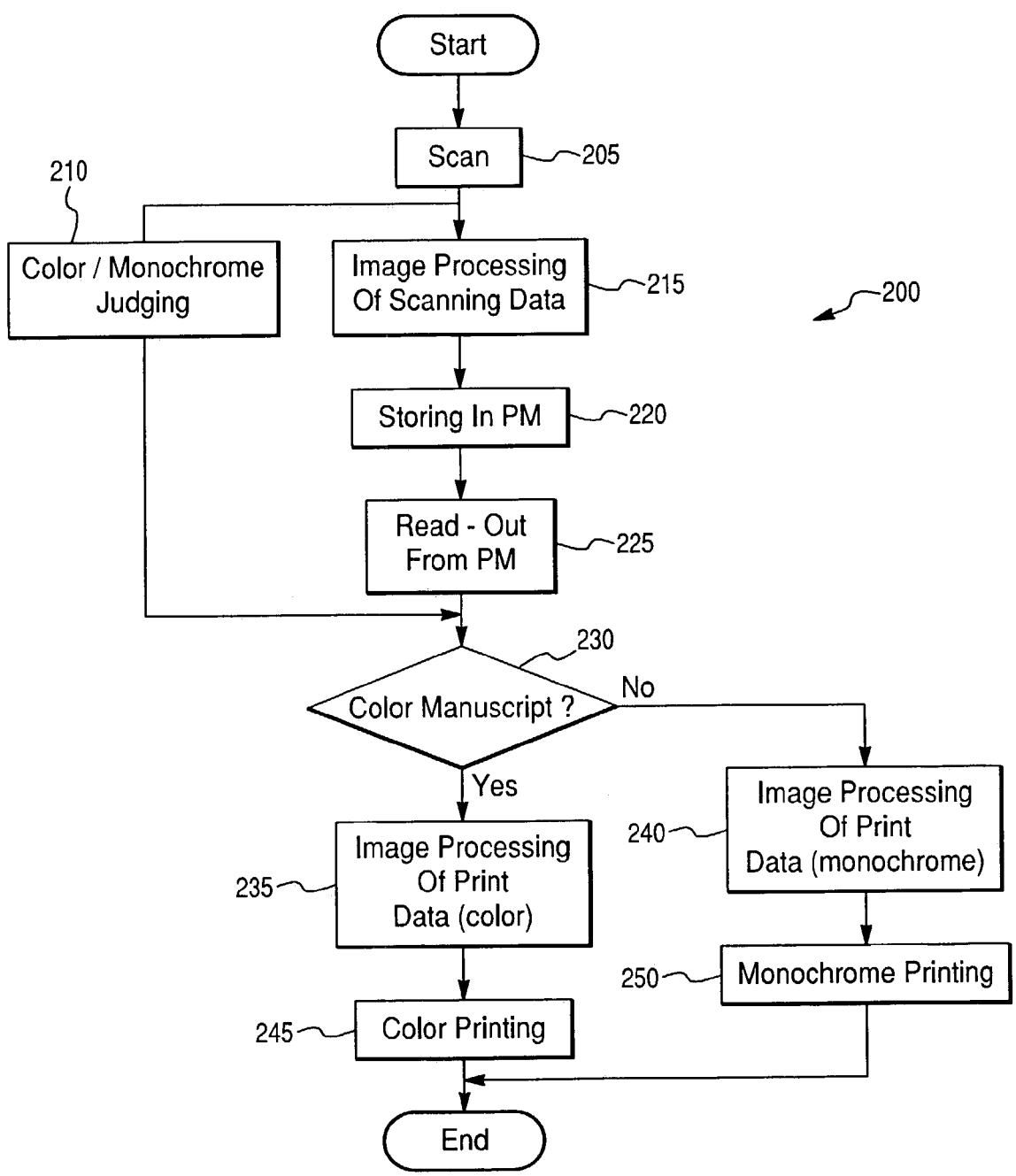
FIG. 2 is a flow chart illustrating the processing steps of an embodiment of the invention.
Figure 4:
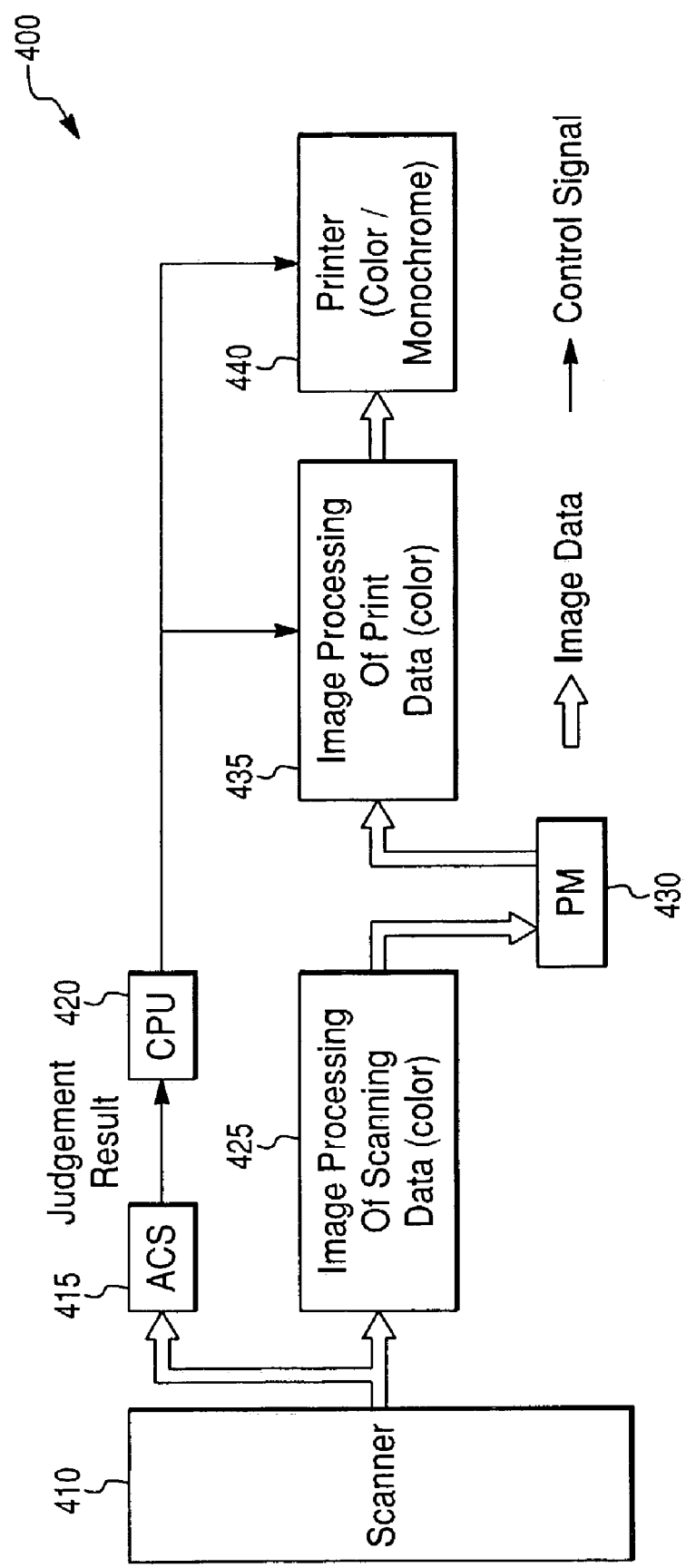
FIG. 4 is a schematic diagram illustrating the components of a photocopier according to one embodiment of the invention.

One preferred embodiment of the present invention is illustrated in FIGS. 2 and 4. Like the conventional copier, a copier according to this embodiment includes a scanner 410, an ACS system 415 and a CPU 420. However, unlike the conventional copier, there is only a single scanning step 205. In this scan, sufficient data is recorded to make the determination 210 of whether the original is color or monochrome and to image process the scanning data 215. In order to accomplish this, the image is always scanned RGB.

After the data is scanned 205, the scanned data is image processed 215 in a scan processor 425. Image processing 215 includes converting the RGB data to CMY data and compressing the CMY data. At substantially the same time, a determination 210 is made in the ACS system 415 whether the original is color or monochrome. That is, the determination 210 may be made at substantially the same time as the conversion step or the compression step. The result of the determination step 210 is a control signal which is stored in the CPU 420. The compressed CMY data is stored 220 in page memory 430. The CMY data stored in page memory 430 is then stored on a non-volatile storage medium, such as a hard disk drive. Before printing, the CMY data is read from the non-volatile storage medium back to the page memory 430.

To print, the compressed CMY data is first read 225 out of page memory 430. Then, the control signal is accessed to control image processing of print data 235, 240 in the image processor 435. In the image processor 435, the compressed CMY data is first decompressed. If the control signal indicates that the original document was color, a color decompression algorithm which generates CMYK data is used. As is known to one of ordinary skill in the art, monochrome (black) data can be extracted from CMY data. If the control signal indicates that the original was monochrome, a monochrome decompression algorithm is used which only generates K data.

In addition to decompression, the print data may go through an optional step to determine whether the image comprises text or figures. This step is advantageous for gradation processing, a step which is generally always performed as part of the print data processing 235, 240.

Gradation processing improves the quality of the copy by smoothing the transitions between colors and different levels of gray. This process is the same for both color and monochrome data. Generally, text information does not need gradation processing because each pixel has the same color. Thus, processing can proceed more quickly, if text is identified before gradation processing. Most figures, however, will need some gradation processing.

When print data processing 235, 240, including gradation processing, is complete, the printer 440 prints a color copy 245 or a monochrome copy 250 as needed.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A color/monochrome copier capable of distinguishing and copying color and monochrome originals with a single scan, comprising:
   a scanner which generates RGB data from an original;
   a color/monochrome processor which determines whether the original is color or monochrome based on the RGB data from the scanner;
   a first data converter which converts the RGB data to CMY data;
   a data compressor which compresses the CMY data; and
   a page memory which stores the compressed CMY data,
   wherein the scanner generates sufficient RGB data in a single scan for the color/monochrome processor to determine if the original is color or monochrome and to produce either a color or monochrome copy therefrom, and
   wherein a data decompressor decompresses the compressed CMY data from the page memory in accordance with the determination of the color/monochrome processor.

2. A copier according to claim 1, further comprising a second data converter which converts the decompressed CMY data from the data decompressor in accordance with the determination of the color/monochrome processor.

3. A copier according to claim 2, further comprising a printing unit for printing a copy of the original based on the data output of the second data converter.

4. A copier according to claim 1, further comprising a hard drive which stores the compressed CMY data from the page memory.

5. A copier according to claim 1, further comprising a control system which causes the color/monochrome processor to determine whether the original is color or monochrome at substantially the same time that the first data converter converts the RGB data to CMY data.

6. A color/monochrome copier capable of distinguishing and copying color and monochrome originals with a single scan, comprising:
   a scanner which generates RGB data from an original;
   a color/monochrome processor which determines whether the original is color or monochrome based on the RGB data from the scanner;

a first data converter which converts the RGB data to CMY data; and a data compressor which compresses the CMY data, wherein the scanner generates sufficient RGB data in a single scan for the color/monochrome processor to determine if the original is color or monochrome and to produce either a color or monochrome copy therefrom, and wherein a control system causes the color/monochrome processor to determine whether the original is color or monochrome at substantially the same time that the data compressor compresses the CMY data.

7. A method of copying, comprising:

scanning an original in a single scan to generate sufficient RGB data for a color/monochrome processor to determine if the original is color or monochrome and to produce either a color or monochrome copy;

determining whether the original is color or monochrome based on the RGB data;

printing a copy of the original without additional scanning of the original;

converting the RGB data to CMY data;

compressing the CMY data;

storing the compressed CMY data; and decompressing the compressed CMY data in accordance with the determination of whether the original is color or monochrome.

8. A method of copying according to claim 7, further comprising converting the decompressed CMY data in accordance with the determination of whether the original is color or monochrome.

9. The method of claim 7, wherein said storing of the compressed CMY data comprises storing the compressed CMY data on a hard drive.

10. The method of claim 7, wherein said determining whether the original is color or monochrome is done at substantially the same time as the step of converting the RGB data to CMY data.

11. A method of copying, comprising:

scanning an original in a single scan to generate sufficient RGB data for a color/monochrome processor to determine if the original is color or monochrome and to produce either a color or monochrome copy;

determining whether the original is color or monochrome based on the RGB data;

printing a copy of the original without additional scanning of the original;

converting the RGB data to CMY data;

compressing the CMY data; and determining whether the original is color or monochrome at substantially the same time as the step of compressing the CMY data.

* * * * *